Nov. 5, 1963  W. VAN DER HOEK ETAL  3,109,601
METHOD OF WINDING ORTHOCYCLICALLY WOUND COILS
Filed Sept. 25, 1959  3 Sheets-Sheet 1

INVENTOR
WILHELMUS L.L. LENDERS
WILLEM VAN DER HOEK
BY LUDOVICUS MEGENS

Frank R. Trifari
AGENT

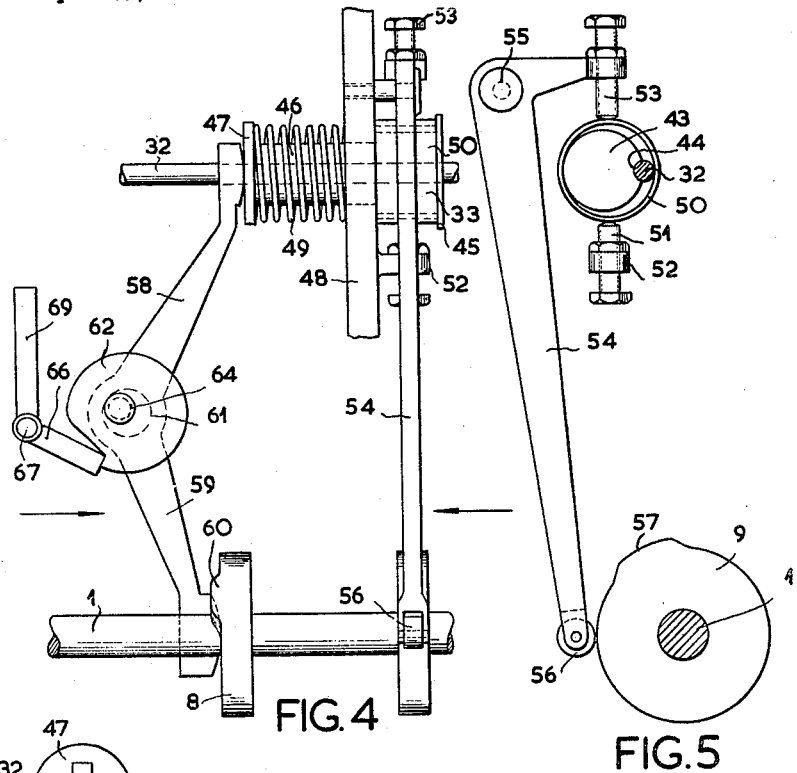
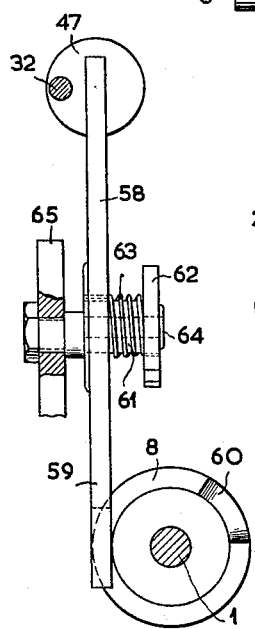
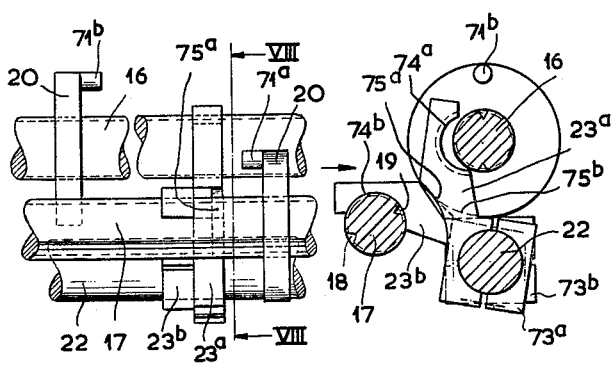

Nov. 5, 1963   W. VAN DER HOEK ETAL   3,109,601
METHOD OF WINDING ORTHOCYCLICALLY WOUND COILS
Filed Sept. 25, 1959   3 Sheets-Sheet 3
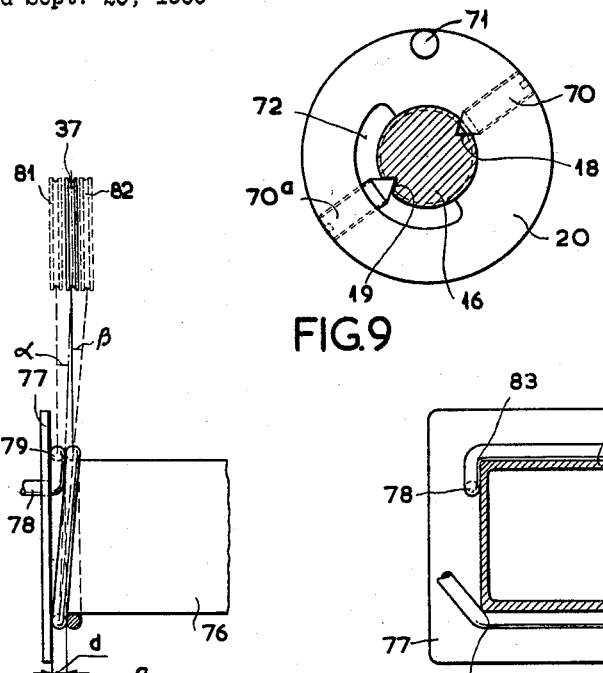
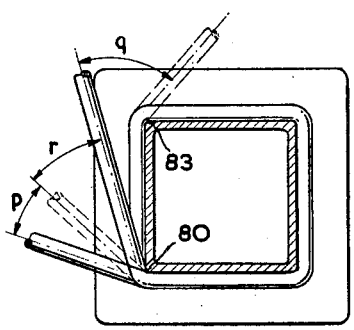
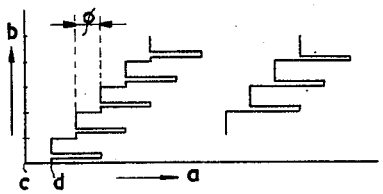
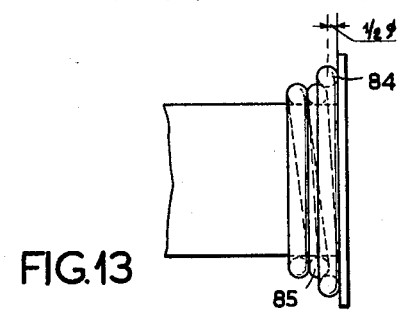
INVENTOR
WILHELMUS L. L. LENDERS
WILLEM VAN DER HOEK
LUDOVICUS MEGENS
BY
AGENT United States Patent Office 3,109,601
Patented Nov. 5, 1963

3,109,601
METHOD OF WINDING ORTHOCYCLICALLY
WOUND COILS
Willem van der Hoek, Wilhelmus Leonard Louis Lenders, and Ludovicus Megens, Eindhoven, Netherlands, assignors to North American Philips Company, Inc., New York, N.Y., a corporation of Delaware
Filed Sept. 25, 1959, Ser. No. 842,516
Claims priority, application Netherlands Oct. 24, 1958
2 Claims. (Cl. 242—9)

This invention relates to a method of and machine for winding orthocyclic coils between flanges and on a template or coil former, preferably coils of insulated copper wire and more particularly such coils having a polygonal aperture for a core and a plurality of layers of windings. The term "orthocyclic coil" is defined as a coil in which at least the greater part of each turn lies in one plane at right angles to the axis of the coil.

Such coils afford the advantage of a high space factor and that the turns of one layer are accommodated in the grooves of the underlying layer and hence cannot come between it or the grooves of another layer which lies still deeper, so that great potential differences between two windings do not occur.

Although orthocyclic coils have been known for a long time, such coils could not be manufactured successively in large numbers in a normal manufacturing process, because the first layer, which is decisive for the further winding process, requires special skilled knowledge on the part of the winder, and the thickness of the wire is frequently only small.

In the method according to our invention for manufacturing such coils each time after laying that portion of a single turn which lies wholly in one plane at right angles to the axis of the coil, the wire to be wound is given a stepwise displacement at some distance from where the wire runs up the coil, in a manner such that the wire comes in the plane of the subsequent turn. The advantage of this method resides in the security that the greater part of the turn actually lies in a plane at right angles to the axis of the coil so that the first layer satisfies the requirements that are imposed for orthocyclically wound coils.

In one embodiment of our invention, i.e., in winding coils having a polygonal aperture for the core, the stepwise displacement is communicated to the wire after the wound wire has been laid on the last edge of the template or coil former located before the beginning of the first turn of the first winding. In the case of a polygonal template or coil former the wire does not encounter any friction on the flat parts of the template or coil former, in contradistinction to the friction on the curved surface of a circular template or coil former, but on the other hand the friction on the edges of a polygonal template or coil former is certainly sufficient to prevent the wire from shifting over the coil former. The use of this embodiment of the invention affords the security that the wire remains in position and does not shift further.

In another embodiment of the invention, in order to prevent an axial pressure from being exerted upon the wire already laid after the stepwise displacement of the wire and in laying the subsequent turn the wire, after having been displaced, is given a second displacement in the same sense as that of the first displacement and immediately or shortly after the first displacement, this second displacement subsequently being obviated.

In a further embodiment of the invention, the second displacement is preferably obviated only after the wire has been laid on the edge which immediately follows after the beginning of the first turn of the first winding. It is thus ensured that the friction of the wire on the coil former or template is sufficient to avoid the occurrence of axial pressure.

In a still further embodiment of the invention, the second displacement is given to the wire for at least the greater part of only the first layer of turns. In laying the second and subsequent layers of turns, the wire is sufficiently guided by the turns of the underlying layer so that any axial pressure need not be feared.

The invention also relates to a coil-winding machine for winding orthocyclic coils between flanges and on a template or coil former, specifically coils of insulated copper wire. In a more specific sense the invention pertains to a machine for winding such coils having a polygonal aperture for the core and a plurality of layers of winding, in which the coil former or template on which the coil is wound performs a rotational movement, and in which at a short distance from the coil there is provided a wire guide which performs with respect to the coil former or template, a reciprocating movement parallel to the coil former or template and with a length of stroke approximately equal to the width of the coil to be wound. The machine is provided with a driving rod which performs a reciprocating continuous movement over approximately the full length of stroke, the wire guide being coupled to this rod so that the movement of the wire guide takes place in a step-wise manner, each step corresponding to the distance between the sequential planes which are at right angles to the axis of the coil and in which each time the largest portion of a turn is located. As before, the advantage of the machine according to the invention resides in the security that the greater part of each turn lies in a plane at right angles to the axis of the coil so that the first layer which is decisive for the correct structure of the coil satisfies the requirements imposed.

In one embodiment of the invention, a coil-winding machine for winding coils having a polygonal aperture for the core is characterized in that the stepwise movement of the wire guide takes place at the moment when the wound wire has just been laid on the last edge of the template or coil former located before the beginning of the first turn of the first winding. Due to the friction which the applied portion of the turn encounters on the edge, the wire is fixed in position and does not shift when now the wire guide is moved and hence the deviation is imparted to the wire.

In a further embodiment of the invention, means are provided for giving the wire guide not only the step-wise movement, but also a transient reciprocating second displacement, the forward part of which lies in the sense of winding. The wire is thus prevented from exerting an axial pressure upon winding already laid and since such axial pressures would be accumulated, a high pressure would finally result, which detracts from the accuracy of the dimensions of the coil and, in the case of insulated wire, could also damage the insulation or deform the wire.

The invention will be described with reference to the accompanying drawing, in which:

FIG. 4 shows the complex of levers which serves to give the wire-guide rod both a stepwise displacement and a reciprocating displacement;

FIG. 5 is a side view of the lever for releasing the clamped connection of the wire-guide rod of FIG. 4, as viewed in the direction of the arrow;

FIG. 6 is an elevation view of the lever for displacing the clamping device of FIG. 4, again as viewed in the direction of the arrow;

FIG. 7 shows, on an enlarged scale, a side view of the double tilting nut of FIG. 1;

FIG. 8 is a side view of FIG. 7, taken along the line VIII—VIII, and as viewed in the direction of the arrow;

FIG. 9 is a side view of the stop nut;

FIG. 10 shows diagrammatically a coil former with two turns of an orthocyclically wound coil, together with the wire guide;

FIG. 10a is an end view of FIG. 10;

FIG. 11 is a side view of FIG. 10 with several positions of the wire to be wound;

FIGS. 12 and 12a show diagrammatically the movement of the wire guide; and

FIG. 13 shows diagrammatically the manner in which the first turn of the second layer is laid.

Figure 1:
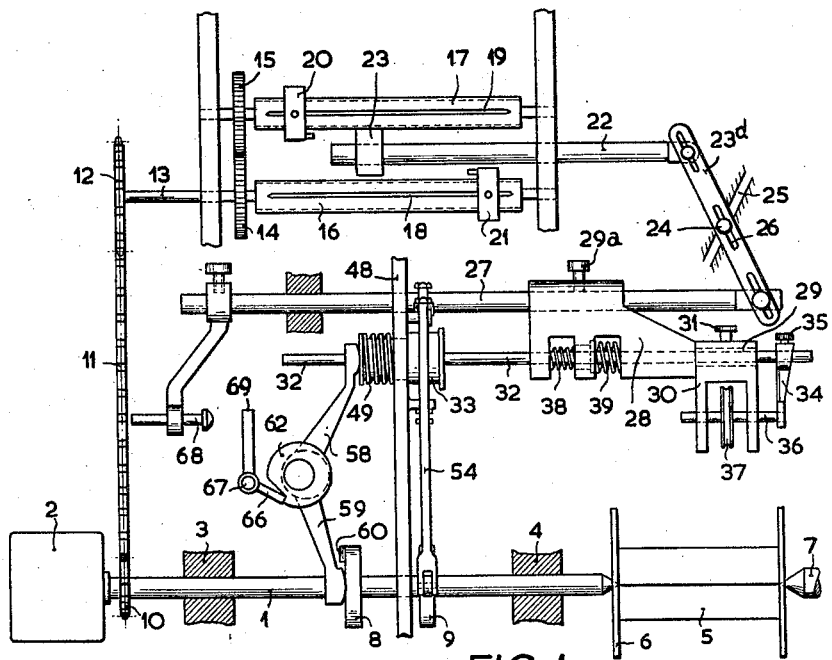
FIG. 1 shows diagrammatically a machine for winding orthocyclic coils.
Figure 2:
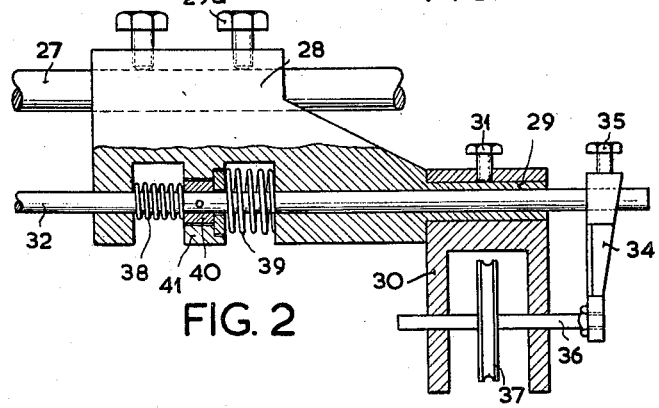
FIG. 2 shows, on an enlarged scale, the connection between the wire guide and the driving rod.
Figure 3:
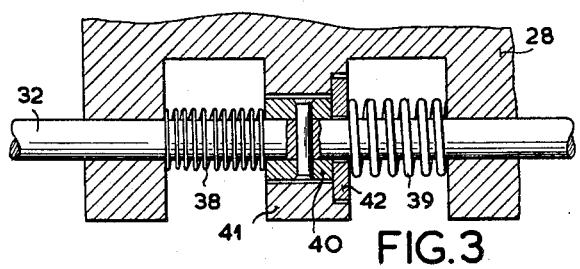
FIG. 3 shows, again on an enlarged scale, part of the coupling between the wire-guide rod and the driving rod.

In the figures, the reference numeral 1 indicates a coil spindle which is driven by an electric motor 2 and which is supported at points 3 and 4. The coil spindle 1 drives a quadrangular coil former 5 with flanges 6, which is supported at the side remote from the coil spindle by means of a mandrel 7 which is displaceable in a manner not shown. In known manner, which is likewise not shown, the coil former 5 follows the movement of the coil spindle 1 upon rotation of the latter. In addition, the coil spindle 1 carries a cup-shaped disc 8 and a cam disc 9. Secured to the coil spindle 1 is a chain wheel 10 which drives through a chain 11 a wheel 12 which is secured to a shaft 13. The latter carries a gear wheel 14 which co-acts with a similar gear wheel 15. The two gear wheels 14 and 15 drive identical threaded shafts 16 and 17, each of which is provided with two diametrically opposite grooves 18 and 19. Movable abutment nuts 20 and 21, which will be described with reference to FIG. 9, are arranged on the threaded shafts 16 and 17. The two shafts are separated by a rod 22 which has rigidly secured to it a double tilting nut 23 which will be described with reference to FIGS. 7 and 8. The rod 22 is pivotally connected to a rod 23d having a pivot 24 which is displaceable in a guide 25. For this purpose, an elongated slot 26 is provided in lever 23d. The latter is pivotally connected to a driving rod 27 which carries a comb-like part 28 rigidly secured to driving rod 27 by means of a screw 29a. The comb-like part 28 is provided with a collar 29 (see FIG. 2) which has secured to it a wire-guide holder 30 by means of a screw 31.

A wire-guide rod 32, which is held in position by means of a clamping device 33 (see FIGS. 4, 5, and 6) carries at one end a coupling piece 34 which is rigidly connected to wire-guide rod 32 by means of a screw 35. The coupling piece 34 also comprises a spindle 36 on which a wire-guide 37 is arranged. The wire-guide 37 can rotate in known manner (not shown) on spindle 36, but cannot slide axially on it. The wire-guide rod 32 can slide in the comb-like part 28. The coupling between the comb-like part 28 and the wire-guide rod 32 comprises two biassed springs 38 and 39, spring 39 being twice as strong as spring 38. Secured to wire-guide rod 32 is a sleeve 40 which can slide freely in a comb 41 of the comb-like part 28. At the side of spring 39, the wire-guide rod 32 is surrounded by a loose plate 42 which can move freely with respect to the rod 32.

The clamping device 33 (see FIGS. 4 and 5) which can hold the wire-guide rod 32 comprises a cylinder 43 having a cavity 44 into which the rod 32 fits in part. One end of cylinder 43 has a collar 45 and its other end has a smaller cylindrical portion 46 provided with a collar 47. The assembly is supported by a fixed part 48 of the machine, a spring 49 being provided between the fixed part 48 and the collar 47. The cylindrical portion 46 can slide in the part 48 of the machine against the action of spring 49. The cylinder 43 is surrounded by a sleeve 50 which is made of resilient material and arranged eccentrically about cylinder 43 so that the rod 32 is clamped between the sleeve 50 and the groove 44. At the lower side of clamping sleeve 50 there is provided an abutment bolt 51 which is secured in a fixed part 52 of the machine. At the upper side of the sleeve 50 there is provided an adjustable pressure bolt 53 arranged in one end of a lever 54. The lever 54 can pivot about a fixed point 55 and comprises, at its other end, a roller 56 which co-acts with a cam 57 of the cam disc 9. One end of a lever 58 presses against the collar 47 and its other end 59 co-acts with a cam 60 of the cup disc 8. The lever 58 can pivot about the cylinder 61 provided with a cam disc 62. Between the cam disc 62 and the lever 58 there is provided a torsion spring 63, the ends of which are connected to cam disc 62 and lever 58 respectively. The sleeve 61 is eccentrically connected to a fixed part 65 of the machine by means of a bolt 64 so that the sleeve 61 can rotate about the bolt 64. A cam 66, which can rotate about a fixed point 67, co-acts with the cam disc 62 and a movable abutment 68 arranged on the driving rod 27 can co-act with an arm 69 of the cam 66. The moveable abutment nuts 20 and 21 are of a special design, as shown in FIG. 9, in order to obtain a rapid and also accurate adjustment of the said nuts. The nut 20 itself, which is provided with two pointed screws 70 and 70a which co-act with the grooves 18 and 19 in the threaded shaft 16 or 17, carries an abutment 71. Each nut is threaded over half its diameter, the other half being provided with a recess 72. Upon loosening the pointer screw 70a, the nut can thus be radially displaced on the threaded shaft 16 and subsequently displaced axially. There are two grooves 18 and 19 to permit the nut to be turned by 180° and subsequently fixed in position.

The double tilting nut 23, as shown in FIGS. 7 and 8, comprises two parts 23a and 23b which are rigidly connected together and clamped in position on the shaft 22 by means of clamping pieces 73a and 73b so that they can rotate about a shaft but cannot slide on it. The said parts are threaded at the area indicated by 74a and 74b. Each part also has a ridge 75a and 75b, respectively, which forms part of the segment of a circle, the centre of which lies on the centre line of the threaded shaft 17 or 16. If in FIG. 7 the set of nuts 23 moves to the right, then at a given moment the abutment 71a co-acts with the segment of a circle 75a and hence the set of nuts 23 thus being tilted so that the screw thread 74a starts to co-act with the threaded shaft 16 and the sense of movement of the shaft 22 varies.

In order to clarify the operation of the assembly, the FIGS. 10, 10a and 11 will first be considered. FIGS. 10 and 10a show a quadrangular coil former 76 which has a flange 77 and on which an orthocyclic coil is to be wound. The wire 79 which is of copper insulated by a lacquer layer and finally provided with a thin layer of thermoplastic material (a so-called adhesive layer) is shown with exaggerated thickness for the sake of clarity. This wire actually has a much smaller diameter. The beginning of the wire is passed through an aperture 78 of the flange 77, the first turn being laid in a plane at right angles to the axis of the coil former 76. As soon as the wire 79 has been laid on the coil former through a little more than three quarters of a turn, the wire must be given a deviation equal to the distance between two planes in which each time the greater part of one turn is located so that the subsequent turn comes at the right place. Since the wire does not encounter friction on the flat portions of a quadrangular coil former, the deviation must be imparted only when the wire has been laid on the last edge (in this case edge 80) before the beginning of the turn. As soon as the wire is thus fixed in position on the edge 80, the wire-guide 37 is given a displacement with respect to the initial position 81, which displacement is equal to the diameter of the wire. The wire-guide 37 lies at some distance from the coil former and, after the displacement thereof, the wire occupies a position as indicated by a dash-and-dot line (at an angle α with the plane of the first turn). This is the correct position of the wire guide for laying the second turn, but then during laying the last quarter of the first turn the wire exerts an axial pressure upon that portion of the first turn which lies on the first edge 83, as may clearly be seen from the figure. The wire is deformed as a result of this pressure and accordingly as more turns are laid, the wound length of the edge 83 is smaller than that of the other edges, which is not permissible in practice. As a result of this difference, it may occur, for example, that on this edge the distance between the last turn of the first layer and the flange, which distance in the case of an orthocyclic coil must be equal to half the diameter of the wire, is larger and may sometimes be more than the diameter of the wire, so that the first turn of the second layer lies on the relevant edge. This axial pressure may be avoided by giving the wire a transient second displacement whereby the wire guide 37 assumes the dotted position 82. The wire itself then assumes the position likewise shown in dotted line of FIG. 10, in which the wire is laid along the first turn 79 without axial pressure occurring. This second displacement must also be given only when the wire is held in position on the edge 80. The second displacement must be maintained until the wire is fixed in position on the subsequent edge 83. Then the wire-guide must be moved from the dotted position 82 to the proper position 37. The foregoing is clarified further in FIG. 11 in which it has been assumed for the sake of clarity that the wire-guide turns about the coil. As soon as the wire has been laid on the edge 80 after passing through angle p, FIG. 11, the wire-guide is given a displacement through an angle α which corresponds to a displacement from position 81 to position 37 in FIG. 10. Then the wire is securely held on the edge 80 and is wound through angle r (FIG. 11). Shortly thereafter, the wire is given a displacement through an angle β whereby the wire-guide in FIG. 10 is moved from position 37 to position 82. This second displacement is obviated as soon as the wire fixedly lies on the edge 83 after passing through the angle q. It will be evident that the second displacement could involve difficulty at the end of the first layer of turns, since there is a risk of the wire then running up the second flange. In view thereof, the second displacement is not given to the wire for the last few turns, which is not objectionable since the axial pressure of the last few turns is not dangerous. It will also be evident that the second displacement is not required for the second and further layers of turns, since the wire then comes to lie in the "dale" of two turns of the underlying layer and if these turns have been laid properly, no more axial pressures occur between the wires of the second layer. The displacements of the wire guide which cause the displacement of the wire are shown again in FIG. 12 in which the length of the coil is plotted on the a-axis and the b-axis is divided into periods in each of which one turn is laid, the position of the wire guide with respect to these two axes being shown. Point c corresponds to the plane in which the first turn has been laid. The wire-guide then steps on to point d, the length of this displacement being equal to the distance between the planes in which two sequential turns have been laid. Subsequently, the wire-guide remains in this position for a short moment (the angle r in FIG. 11) and then a second displacement follows which is obviated again after the angle o, whereafter the wire-guide returns to the position which it occupied at d. This is repeated during the greater part of the first layer of turns. It is also possible to arrange for the second displacement to follow immediately the first displacement, as shown in FIG. 12a.

With reference to FIGS. 1, 2, 3, 4, 5 and 6, it will now be explained in what manner the various displacements are obtained. When the electric motor 2 sets the coil spindle 1 into motion, the coil former 5 starts to rotate, which also causes rotation of the chain wheels 10 and 12, the latter of which has a diameter twice that of the wheel 10. The gear wheels 14 and 15 are of equal size so that the threaded shafts 16 and 17 rotate at half the speed of the spindle 1. The wire-guide 37 is assumed to have a position such that the first turn is laid on the coil former 5. Due to the motion of the threaded shaft 16 or 17, and of the co-acting nut 23, the rod 22 is moved to the left so that the driving rod 27 is moved to the right. This driving rod takes along the comb-like part 28 and the wire-guide holder 30. However, the wire-guide rod 32 is clamped between the cylinder 43 and the resilient sleeve 50 and since the wire-guide 37 is secured to the spindle 36 which in turn is rigidly connected to the coupling piece 34, one end of which is secured to the wire-guide rod 32, the wire-guide keeps in position. The spring 38 is thus stretched and sleeve 40 slides in the comb 41 due to its being rigidly connected to the wire-guide rod 32. As soon as the coil spindle 1 has performed one revolution, the cam 57 of cam disc 9 engages the roller 56 so that the lever 54 turns about the fixed point 55 and the pressure bolt 53 deforms the resilient sleeve 50, the lower side of which engages the fixed abutment 51. Consequently, the wire-guide rod 32 is released and by the action of the stretched spring 38, moves on one step so that the wire-guide 37 assumes the next position. The variation in the position of the wire-guide 37 thus takes place in a step-wise manner. Since the spring 39 is twice as strong as the spring 38, the rest position of the rod 32 with respect to the comb-like part 28 is fully determined. After the wire-guide rod 32 has been displaced, the lever 54 returns to its initial position since the cam 57 releases the roller 56 and the wire-guide rod 32 is again clamped in position. After the coil spindle 1 has rotated further a small angle (angle r of FIG. 11), the cam 60 of cup disc abuts against the end 59 of lever 58. This lever thus turns about the eccentric 61, its other end being urged against the collar 47 of clamping device 33. The clamping device 33, which can slide in the fixed part 48, is then moved to the right against the pressure of spring 49 and thus drives the wire-guide rod 32, whereby the sleeve 40 and the plate 42 are taken along and spring 39 also is stretched, since the movement of the wire-guide rod is now much faster than the continuous movement of the comb-like part 28. Thus, the second displacement of the wire-guide is obtained. As soon as the cam 60 releases the lever arm 59, the arm 58 moves to the left and, due to the springs 49 and 39, the clamping device 33, the sleeve 40 and the plate 42 re-assume their initial positions.

The second displacement of the wire-guide is not required for laying the last turns of the first layer and all the turns of the subsequent layers. The second displacement is switched off by means of the moveable abutment 68 which is arranged on driving rod 27 and which at a given moment engages the arm 69 of cam 66. The cam 66 is thus turned away and now, due to the stretched torsion spring 63, the eccentric 61 performs half a revolution about the bolt 64 so that the end of lever 58 no longer engages the collar 47 and hence the lever 58 is inoperative. By means of a simple lever (not shown), the eccentric 61 is moved into the initial position before the winding of a new coil is started, whereby the torsion spring 63 is stretched again and the cam 66 again meshes with cam disc 62.

A second displacement in laying the second layer of turns cannot be obtained with the structure shown and described. However, the clamping device may be connected to the fixed part 48 in a simple manner so that a movement which is subject to spring tension is possible to each side, in which event two levers 58 are required which are applied to each side of the clamping device.

The laying of the second layer of turns, when the wire-guide 37 thus each time must move in a stepwise manner to the left, is effected in a similar manner as described for the movement to the right. In this case, sleeve 40 and plate 42 keep in position to the right of the comb 41 until the wire-guide rod is released and the sleeve and the plate again assume the positions shown. The force then acting upon the rod 32 is equal to the difference between the spring forces of the springs 38 and 39.

The laying of the first turn of the second layer, indicated by 84 in FIG. 13, will now be described. It is usually desirable for each layer to comprise the same number of turns. When the first turn of the first layer engages the flange, then the last turn of the first layer must lie at a distance from the flange equal to half the diameter of the wire, in order to obtain the first turn of the second layer in the proper position. Now, the machine is adjusted so that three quarters of a revolution of the coil spindle 1 after the last displacement of the wire-guide, the driving rod 27 reaches its extreme position. Thereafter, the movement of the driving rod 27 reverses due to tilting over the nuts 23. If the distance covered by the driving rod 27 during a complete revolution of the coil spindle 1, is indicated by $s$, then the driving rod at the moment of tilting has covered $\frac{3}{4}s$. During the remaining one quarter of a revolution of the coil spindle, the driving rod 27 covers the distance $\frac{1}{4}s$, but in the opposite sense. Consequently, the total displacement is $\frac{1}{2}s$, and when the wire-guide rod is now released, it can cover only a distance of $\frac{1}{2}s$ in the original sense. Thus, the position of the first turn of the second layer is determined.

One of the advantages of the use of abutment nuts and tilting nuts and a threaded shaft with respect to a known drive comprising a cam disc and gear wheels, is that, when the number of turns per layer is varied, the abutment nuts may be axially displaced without the above-mentioned adjustment being disturbed. At the same time, it may be shown with reference to FIG. 13 how important it is that more particularly in winding thin wire the axial pressure of the turns is suppressed as far as possible. If, for example, wire of 50 microns is wound, the spacing between the last turn and the flange must be 25 microns. If this spacing is only 15 or 20 microns larger, the turn 84 is irrevocably drawn between the turn 85 and the flange and the winding of the coil also irrevocably fails.

The number of turns per layer is adjusted by adjustment of the abutment nuts 20 and 21. The length of stroke of the wire-guide 37 is exactly determined by the displacement of the pivot 24 of lever 23. Also the proper adjustment of the spacing between the last turn of the first layer and the flange is determined by the adjustment of pivot 24. If a fixed distance between the flanges is given and also with a given thickness of the wire, it is sometimes not quite possible to obtain a distance equal to half the diameter of the wire between the last turn of the first layer and the flange. In this case, the wire must be laid with a little amount of play between the individual turns and this may also readily be achieved by adjustment of the pivot 24. Also in the case of wire having an irregular outer diameter, the laying of the turns with a little amount of play is sometimes desirable. It is then advantageous to choose the inner side of flange 6 as the starting point. In order to leave this starting point unchanged upon adjustment, the guide 25 in which the pivot 24 is displaceable is arranged parallel to the initial position of lever 23.

With a machine realized in practice, the smallest thickness of wire with which a coil could be wound was 50 microns, and the largest wire thickness was 500 microns. The number of revolutions of the coil spindle was 1000 per minute. It is evidently possible to arrange a plurality of coil formers on the coil spindle, in which event a corresponding number of wire-guides must be provided which can be controlled, however, by a common wire-guide rod.

As a rule, it is preferable for the wire-guide to be arranged from the coil to be wound at a distance which is not unduly large, since otherwise the second displacement becomes unnecessarily large. The closer the wire-guide is arranged to the coil, the smaller the second displacement need be.

While we have described our invention in connection with specific embodiments, other modifications thereof will be apparent to those skilled in this art. Accordingly, we do not wish to limit ourselves to the specific embodiments shown and described, but desire that the scope of the invention to be as broadly construed as permissible in view of the subjoined claims.

What we claim is:

1. A method of winding orthocyclically wound coils on a polygonal coil former having flanges between which the coil is wound comprising the steps, laying a single turn of the wire on a coil former so that a portion lies in a plane at right angles to the axis of the coil, displacing the wire step-wise after the wire is laid over the last edge of the coil former located from the beginning of the first turn of the first winding until the wire comes in the plane of a subsequent turn intermediate the adjacent edges of said coil former and further displacing the wire until the wire reaches the edge of the coil former which is in contact with the first turn so that axial pressure is not exerted on the first turn, and restoring the wire to a position in the plane of said subsequent turn and at right angle to the axis of the coil after the wire is secured on said last mentioned edge.

2. A method of winding orthocyclically wound coils on a polygonal coil former having flanges between which the coil is wound comprising the steps, laying a single turn of the wire on a coil former so that a portion lies in a plane at right angles to the axis of the coil, displacing the wire step-wise after the wire is laid over the last edge of the coil former located from the beginning of the first turn of the first winding until the wire comes in the plane of a subsequent turn intermediate the adjacent edges of said coil former and further displacing the wire until the wire reaches the edge of the coil former which is in contact with the first turn so that axial pressure is not exerted on the first turn, restoring the wire to a position in the plane of said subsequent turn and at right angles to the axis of the coil after the wire is secured on said last mentioned edge, repeating the foregoing sequence, and continuing to wind for several turns of the first layer of windings after which the said further displacement of the wire is omitted.

References Cited in the file of this patent

UNITED STATES PATENTS

| | | |
|---|---|---|
| 1,504,005 | Vienneau | Aug. 5, 1925 |
| 1,865,236 | Daniels | June 28, 1932 |
| 2,807,869 | Rice | Oct. 1, 1957 |
| 2,848,794 | Roth | Aug. 26, 1958 |
| 2,930,014 | Van der Hoek et al. | Mar. 22, 1960 |